United States Patent
Kim et al.

(10) Patent No.: US 12,070,813 B2
(45) Date of Patent: Aug. 27, 2024

(54) ELECTRODE HAVING IMPROVED ELECTRODE TAB WELDING CHARACTERISTICS AND SECONDARY BATTERY COMPRISING THE SAME

(71) Applicant: LG Chem, Ltd., Seoul (KR)

(72) Inventors: Tae Gon Kim, Daejeon (KR); Seung Yeop Seo, Daejeon (KR); Seong Kyun Shin, Daejeon (KR); Nam Kyu Lee, Daejeon (KR); Ha Neuol Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 528 days.

(21) Appl. No.: 16/615,305

(22) PCT Filed: Jul. 12, 2018

(86) PCT No.: PCT/KR2018/007916
§ 371 (c)(1),
(2) Date: Nov. 20, 2019

(87) PCT Pub. No.: WO2019/050147
PCT Pub. Date: Mar. 14, 2019

(65) Prior Publication Data
US 2020/0185690 A1 Jun. 11, 2020

(30) Foreign Application Priority Data
Sep. 8, 2017 (KR) .................. 10-2017-0115201

(51) Int. Cl.
*H01M 50/538* (2021.01)
*B23K 20/10* (2006.01)
(Continued)

(52) U.S. Cl.
CPC ............ *B23K 20/10* (2013.01); *H01M 50/536* (2021.01); *H01M 50/538* (2021.01); *H01M 2004/027* (2013.01); *H01M 2004/028* (2013.01)

(58) Field of Classification Search
CPC .. H01M 50/55; H01M 50/533; H01M 50/534; H01M 50/536; H01M 50/538
See application file for complete search history.

(56) References Cited

U.S. PATENT DOCUMENTS

RE36,102 E * 2/1999 Dougherty .......... H01M 50/553
429/211
8,491,673 B2 7/2013 Daidoji et al.
(Continued)

FOREIGN PATENT DOCUMENTS

CN 203134891 U 8/2013
JP 2008066170 A 3/2008
(Continued)

OTHER PUBLICATIONS

JP-2017076576-A English machine translation (Year: 2023).*
(Continued)

*Primary Examiner* — Ula C Ruddock
*Assistant Examiner* — Armindo Carvalho, Jr.
(74) *Attorney, Agent, or Firm* — Lerner David LLP

(57) ABSTRACT

Disclosed herein are an electrode having improved electrode tab welding characteristics configured such that one or more non-coated electrode tabs are provided for a plurality of stacked electrodes having the same polarity in order to maintain welding safety in the case in which the number of electrode layers that are stacked is increased in order to achieve high output and capacity, and a secondary battery including the same. Consequently, it is possible to prevent a plurality of electrode tabs from being cut at the time of
(Continued)

welding the electrode tabs. In addition, the lower end of an electrode lead that is welded to non-coated electrode tabs provided for a plurality of stacked electrodes having the same polarity is punched so as to correspond to the non-coated electrode tabs. Consequently, it is possible to improve flexibility for a step formed in the secondary battery electrode.

6 Claims, 10 Drawing Sheets

(51) Int. Cl.
  *H01M 4/02* (2006.01)
  *H01M 50/536* (2021.01)

(56) References Cited

U.S. PATENT DOCUMENTS

| | | | |
|---|---|---|---|
| 2008/0060189 A1 | 3/2008 | Daidoji et al. | |
| 2012/0164520 A1* | 6/2012 | Choi | H01M 50/536 429/211 |
| 2012/0196173 A1* | 8/2012 | Kim | B23K 20/10 228/110.1 |
| 2013/0143109 A1* | 6/2013 | Kim | H01M 50/543 429/178 |
| 2016/0049696 A1 | 2/2016 | Choi | |
| 2016/0315301 A1 | 10/2016 | Kim et al. | |
| 2017/0077480 A1 | 3/2017 | Hwang et al. | |

FOREIGN PATENT DOCUMENTS

| | | |
|---|---|---|
| JP | 2013187077 A | 9/2013 |
| JP | 2013534361 A | 9/2013 |
| JP | 5877047 B2 | 3/2016 |
| JP | 2017076576 A * | 4/2017 |
| KR | 20080023182 A | 3/2008 |
| KR | 20100135382 A | 12/2010 |
| KR | 20120072575 A | 7/2012 |
| KR | 20160020284 A | 2/2016 |
| KR | 20160126157 A | 11/2016 |
| KR | 20170022317 A | 3/2017 |
| KR | 20170032031 A | 3/2017 |
| WO | 2013105361 A1 | 7/2013 |

OTHER PUBLICATIONS

Chinese Search Report for Application No. 201880009649.6, dated Jul. 27, 2021, 3 pages.

International Search Report from Application No. PCT/KR2018/007916 mailed Oct. 17, 2018, 2 pages.

* cited by examiner

[FIG. 1]
-- Prior Art --
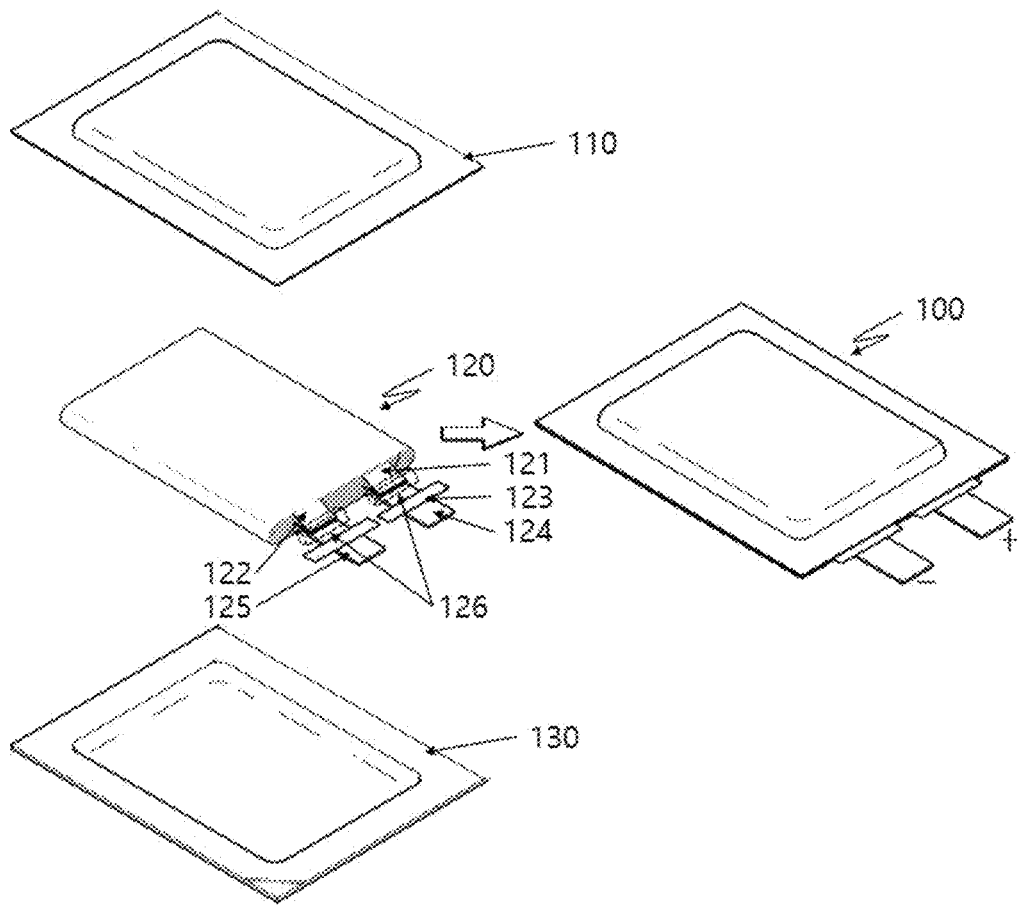

[FIG. 2]
-- Prior Art --
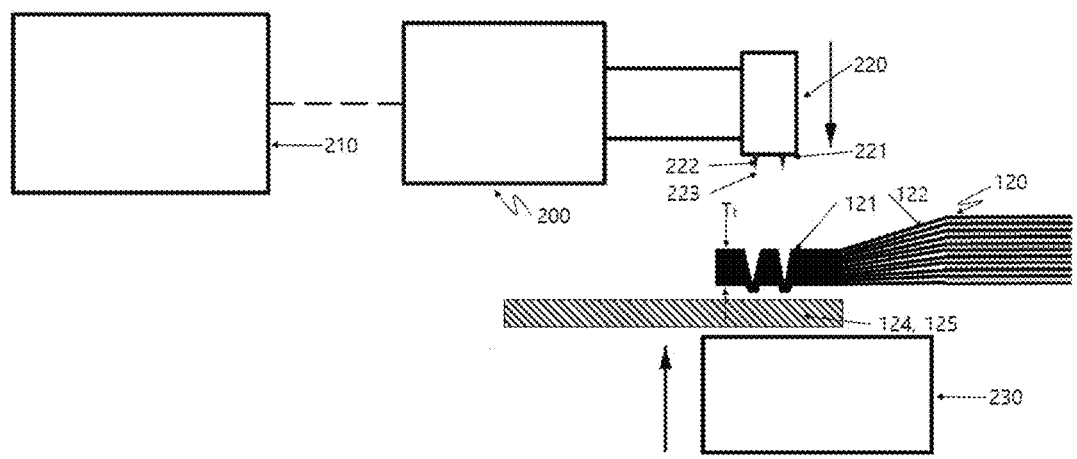
[FIG. 3]
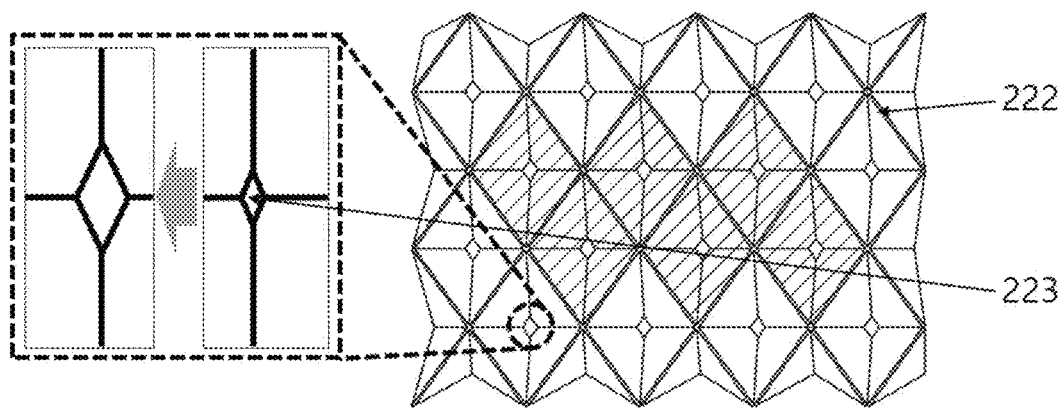

[FIG. 4]
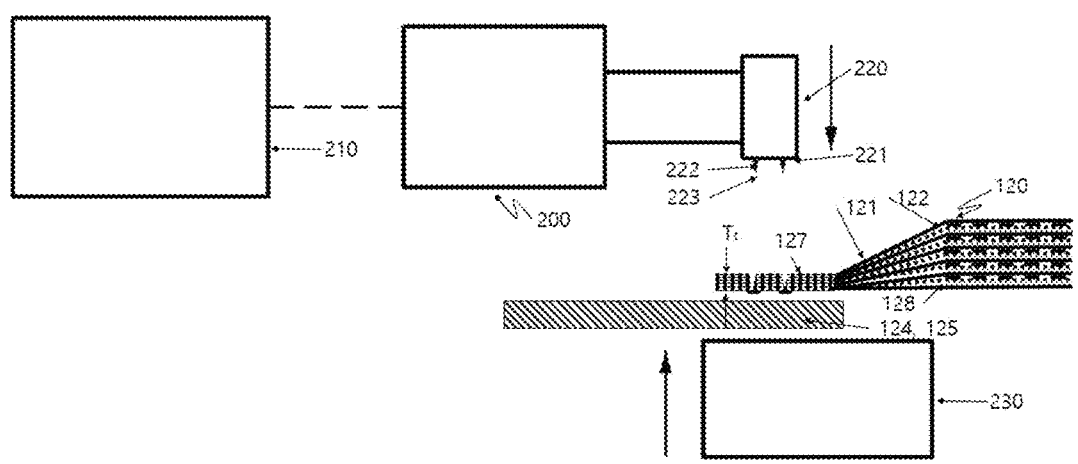

[FIG. 5]
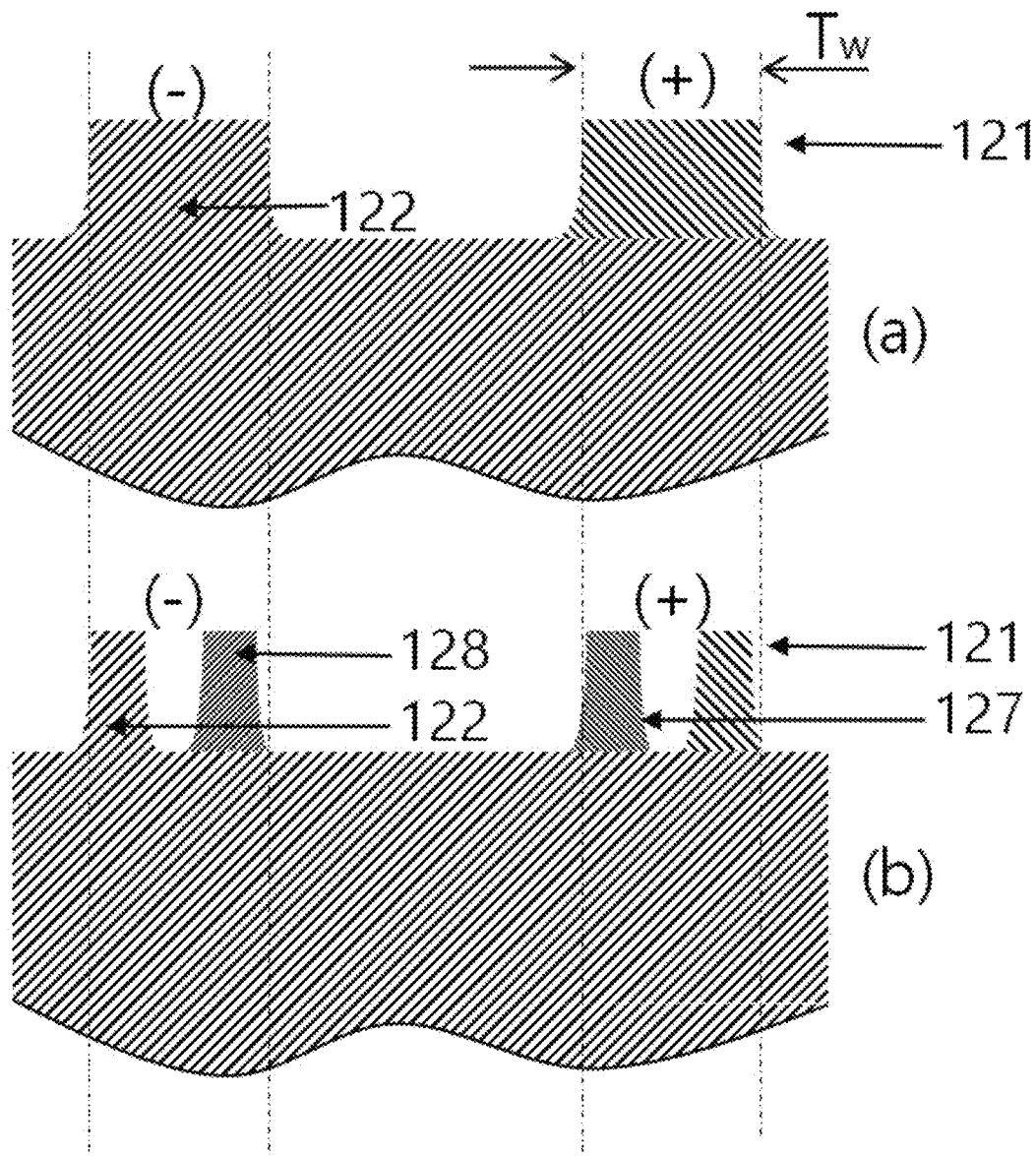

[FIG. 6]
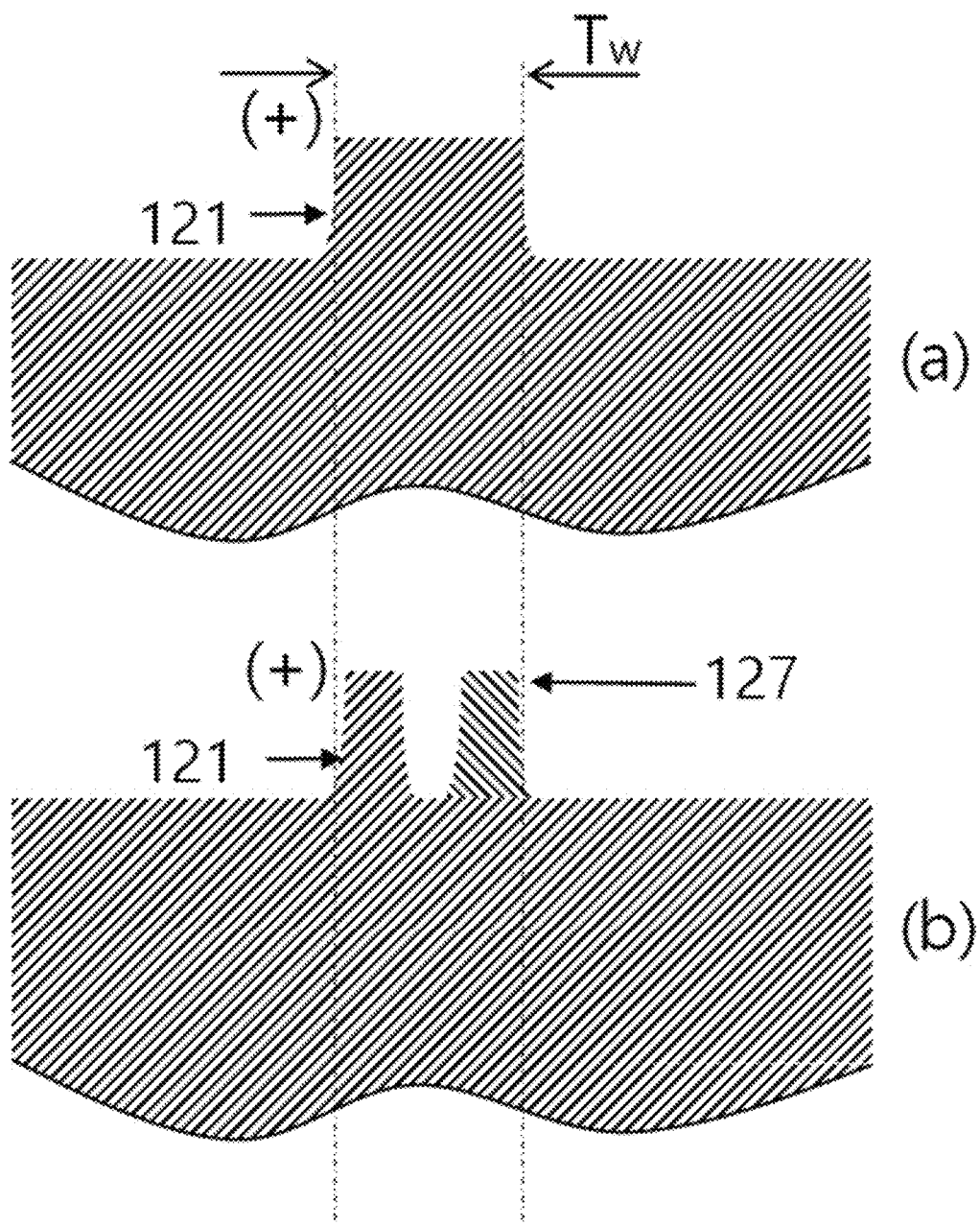

[FIG. 7]
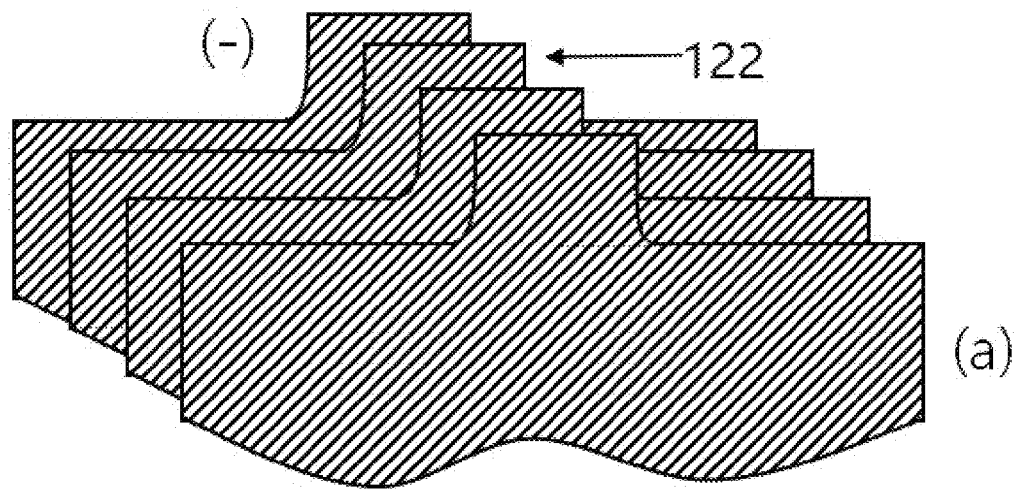
(a)
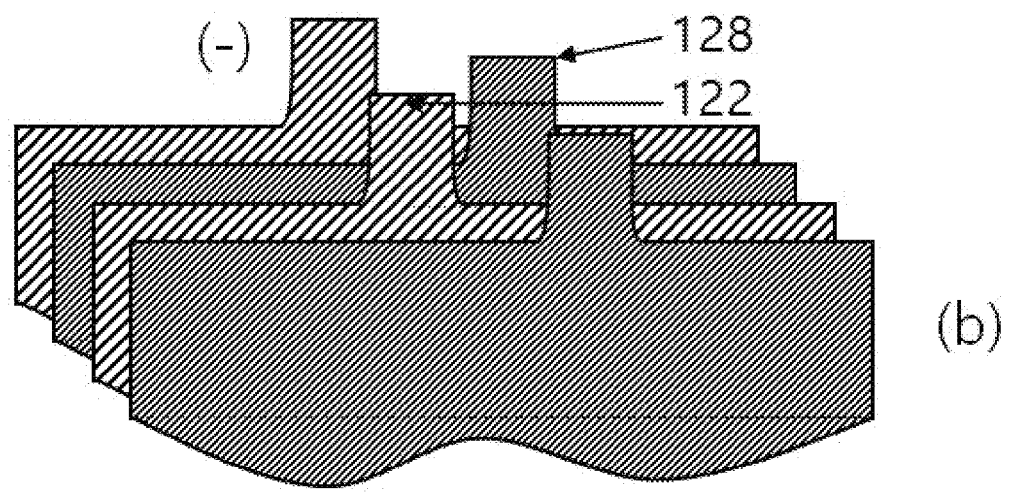
(b)

[FIG. 8]
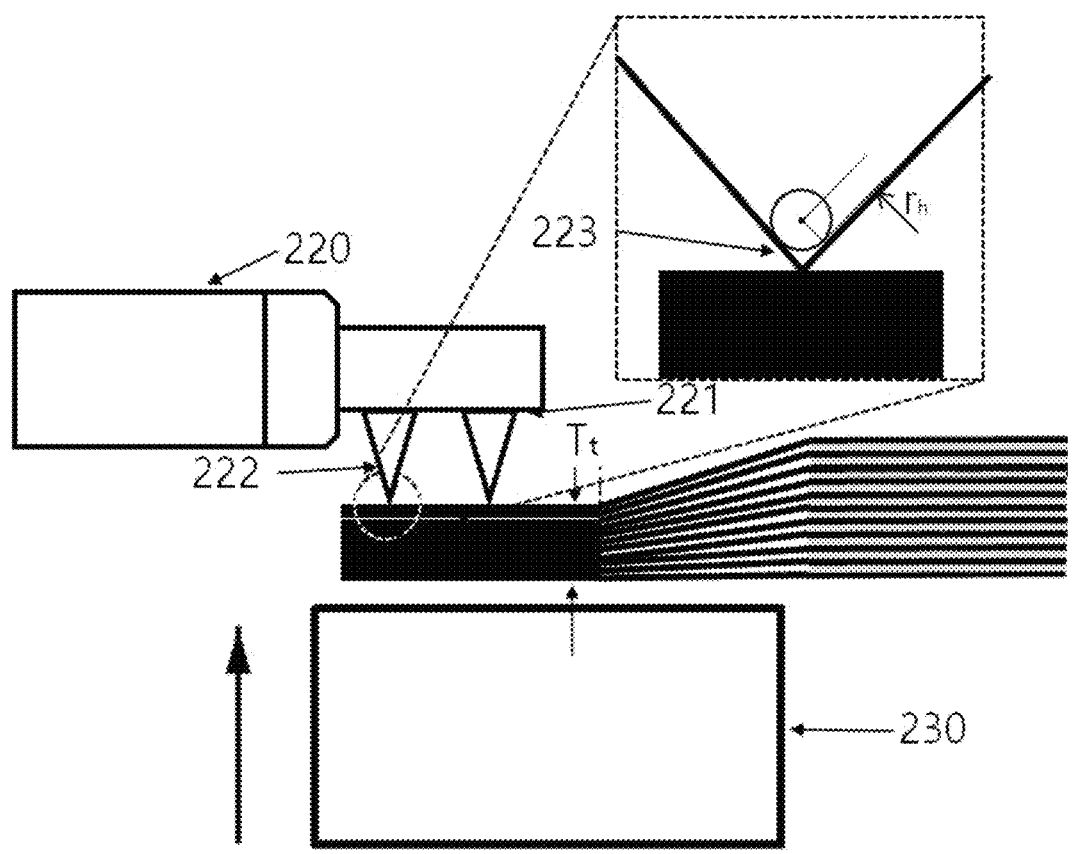

[FIG. 9]
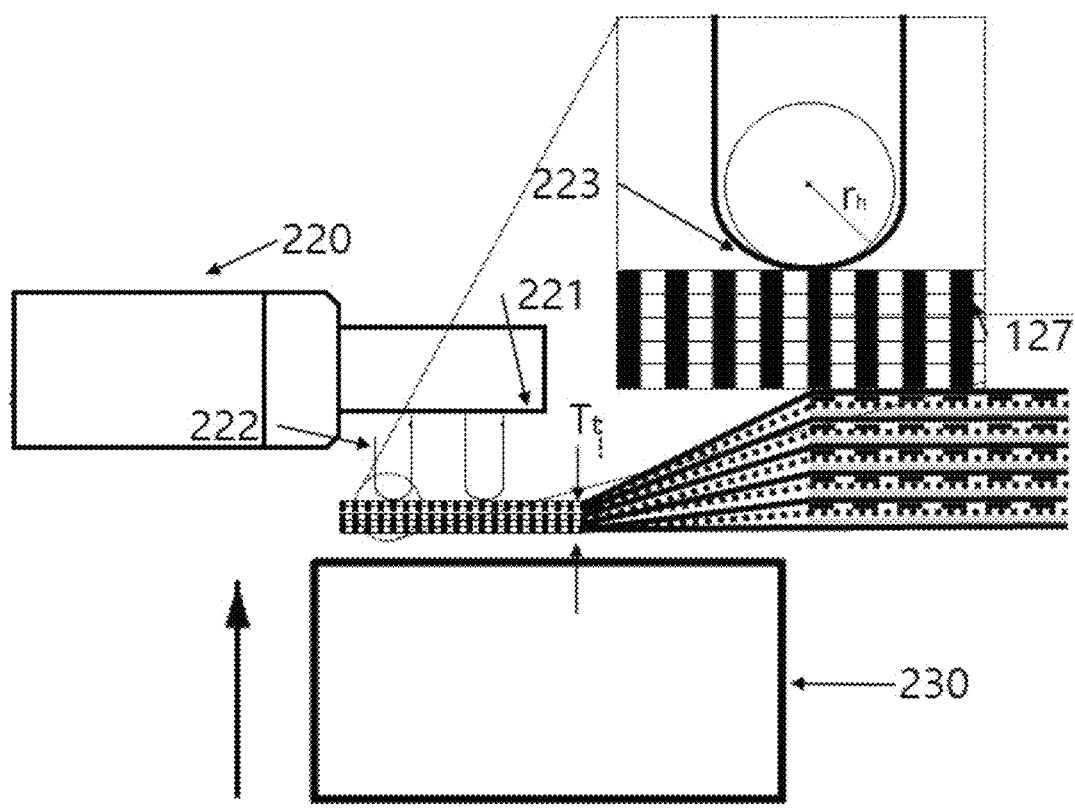

[FIG. 10]
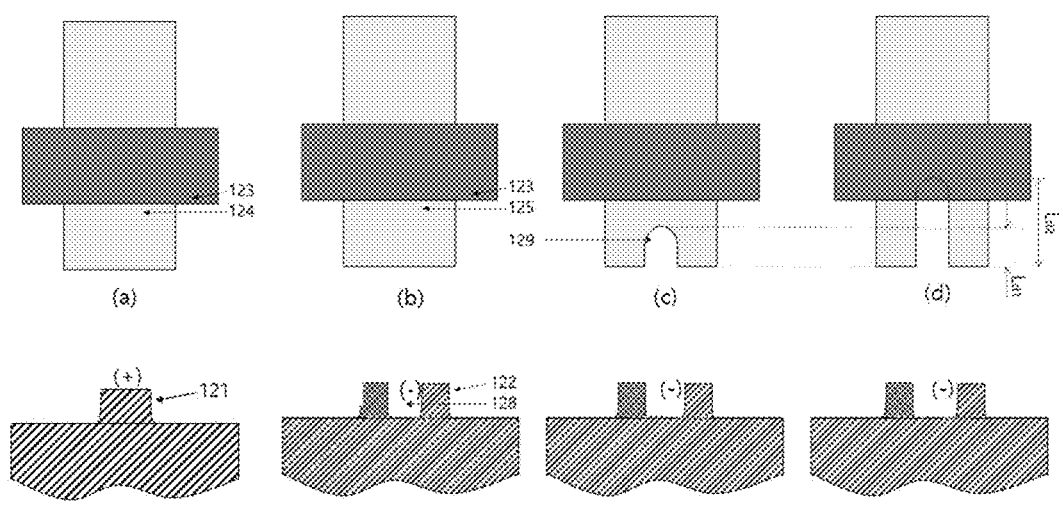

[FIG. 11]

| | Form of electrode | Tab-terminal form | Welding defect rate (%) | | Welding tensile strength (kgf/44mm) | |
|---|---|---|---|---|---|---|
| | | | Positive electrode | Negative electrode | Positive electrode | Negative electrode |
| Comparative Example 1 | Conventional electrode | Conventional tabs | 2.6 | 3.4 | 52 | 91 |
| Example 1 | Notching shape is changed. New electrodes are sequentially stacked. | Conventional tabs | 0.5 | 0.9 | 54 | 94 |
| Example 2 | Notching shape is changed. New electrodes are sequentially stacked. | Shape of lower electrode lead is changed. ($L_{d1}$) Type | 0.4 | 0.6 | 56 | 95 |
| Example 3 | Notching shape is changed. New electrodes are sequentially stacked. | Shapes of lower electrode and protective film are changed. ($L_{d2}$) Type | 0.3 | 0.4 | 58 | 97 |

ELECTRODE HAVING IMPROVED ELECTRODE TAB WELDING CHARACTERISTICS AND SECONDARY BATTERY COMPRISING THE SAME

TECHNICAL FIELD

The present application is a national phase entry under 35 U.S.C.§ 371 of International Patent Application No. PCT/KR2018/007916, filed on Jul. 12, 2018, published in Korean, which claims priority from Korean Patent Application No. 10-2017-0115201, filed on Sep. 8, 2017, the disclosures of which are hereby incorporated by reference in their entireties.

The present invention relates to an electrode having improved electrode tab welding characteristics and a secondary battery including the same, and more particularly to an electrode having improved electrode tab welding characteristics configured such that one or more non-coated electrode tabs are provided for a plurality of stacked electrodes having the same polarity in order to maintain welding safety in the case in which the number of electrode layers that are stacked is increased in order to achieve high output and capacity, and a secondary battery including the same.

BACKGROUND ART

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid vehicle, a power storage apparatus for storing surplus power or new and renewable energy, and a backup power storage apparatus, as well as small-sized products, such as a digital camera, a portable digital versatile disc (DVD) player, an MP3 player, a cellular phone, a personal digital assistant (PDA), a portable game device, a power tool, and an electric bicycle (E-bike).

Secondary batteries may be classified based on the structure of an electrode assembly having a positive electrode/separator/negative electrode structure. Typically, the electrode assembly may be a jelly-roll type (wound type) electrode assembly, which is configured to have a structure in which long sheet type positive electrodes and long sheet type negative electrodes are wound in the state in which separators are interposed respectively between the positive electrodes and the negative electrodes, a stacked type electrode assembly, which is configured to have a structure in which a plurality of positive electrodes cut so as to have a predetermined size and a plurality of negative electrodes cut so as to have a predetermined size are sequentially stacked in the state in which separators are interposed respectively between the positive electrodes and the negative electrodes, or a stacked/folded type electrode assembly, which is configured to have a structure in which bi-cells or full cells, each of which is configured to have a structure in which predetermined numbers of positive electrodes and negative electrodes are stacked in the state in which separators are disposed respectively between the positive electrodes and the negative electrodes, are wound.

In recent years, a lot of interest has been directed to a pouch-shaped battery configured to have a structure in which a stacked or stacked/folded type electrode assembly is mounted in a pouch-shaped battery case made of a laminated aluminum sheet because of low manufacturing costs, light weight, easy modification of the shape thereof, etc. Furthermore, the use of such a pouch-shaped battery has gradually increased. Such a secondary battery generally includes an electrode assembly, configured to have a structure in which positive electrode plates and negative electrode plates are sequentially stacked in the state in which separators are interposed respectively between the positive electrode plates and the negative electrode plates, and a battery case, which is a sheathing member for receiving electrode assembly. The electrode assembly is provided with a plurality of positive electrode tabs extending from the positive electrode plates and a plurality of negative electrode tabs extending from the negative electrode plates. The positive electrode tabs and the negative electrode tabs are coupled respectively to a positive electrode lead and to a negative electrode lead using an ultrasonic welding machine. Here, the positive electrode tabs and the negative electrode tabs constitute electrode tabs, and the positive electrode lead and the negative electrode lead constitute electrode leads.

In the case of a stacked type electrode, rather than a wound type electrode, several non-coated electrode tabs to several tens of non-coated electrode tabs are welded to form an electrical conduction path such that a secondary battery can operate electrically. Particularly, in the case of a vehicle battery, the number of electrode layers that are stacked is increased to 20 or 30 for each of a positive electrode and a negative electrode in order to achieve higher output and capacity. As a result, poor welding may occur.

Also, in the case of ultrasonic or laser welding, high energy is required to weld the thickened layers. As a result, a welded portion may be damaged, and welding defects may be increased. Furthermore, even though welding is completed at the step of manufacturing a battery cell, additional high-energy welding is performed to weld thick bus bars at the process of manufacturing a battery pack. At this time, the welded electrode tab portions in the battery cell may be cut due to poor welding.

When the electrode tabs are welded to the electrode lead using the ultrasonic welding machine, as described above, some of the electrode tabs may be poorly welded. In the case in which the electrode tabs are strongly welded to the electrode lead, the electrode tabs may be cut.

Conventionally, the welding method and the welding surface are controlled in order to stably connect the electrode tabs to the electrode lead. However, no attempts have been made to improve the shape of a non-coated part of each of the electrode tabs so as to increase the stability of welding.

Meanwhile, Korean Patent Application Publication No. 2017-0022314 discloses a battery cell having electrode tabs connected at a plurality of positions. The construction in which first electrode tabs and second electrode tabs formed in non-coated parts constitute lead coupling portions, which are coupled to electrode leads by ultrasonic welding, corresponds somewhat to claims 1 and 2. However, this publication does not suggest technology for arranging non-coated tabs that are provided for electrodes having the same polarity so as to alternately overlap each other.

Korean Patent Application Publication No. 2017-0032031 discloses an electrode stack having a multi-tab structure and a battery including the same. The construction in which first and second electrode tabs formed in non-coated parts are electrically connected to electrode leads by welding corresponds somewhat to the present invention. However, this publication does not suggest technology for arranging non-coated tabs that are provided for electrodes having the same polarity so as to alternately overlap each other.

Korean Patent Application Publication No. 2016-0020284 discloses a battery pack. The construction in which first and second electrode tabs formed in non-coated parts are directly connected to terminal holes formed in a circuit board corresponds somewhat to the present invention. However, this publication does not suggest technology for arranging non-coated tabs that are provided for electrodes having the same polarity so as to alternately overlap each other.

Japanese Registered Patent No. 5877047 discloses a laminated type energy device and a method of manufacturing the same. The construction in which withdrawn electrodes and tab electrodes formed in non-coated parts are connected to each other by welding corresponds somewhat to the present invention. However, this patent does not suggest technology for arranging non-coated tabs that are provided for electrodes having the same polarity so as to alternately overlap each other.

In the case in which electrodes tabs and electrode leads of a secondary battery, particularly a pouch-shaped secondary battery, are coupled to each other by ultrasonic welding, as described above, a plurality of sheets of thin foil constituting non-coated electrode tabs overlaps each other at the horn, whereby welding may not be completely performed or the foil may be cut at the time of manufacturing a battery pack. As a result, the performance of the battery may be reduced. However, a secondary battery electrode configured such that the shape of non-coated electrode tabs is improved in order to prevent the non-coated electrode tabs from being cut after welding in order to solve the above problems and a secondary battery including the same have not yet been proposed.
Korean Patent Application Publication No. 2017-0022314
Korean Patent Application Publication No. 2017-0032031
Korean Patent Application Publication No. 2016-0020284
Japanese Registered Patent No. 5877047

DISCLOSURE

Technical Problem

The present invention has been made in view of the above problems and other technical problems that have yet to be resolved, and it is an object of the present invention to provide an electrode having improved electrode tab welding characteristics configured such that one or more non-coated electrode tabs are provided for a plurality of stacked electrodes having the same polarity in order to maintain welding safety in the case in which the number of electrode layers that are stacked is increased in order to achieve high output and capacity, and a secondary battery including the same.

It is another object of the present invention to provide an electrode having improved electrode tab welding characteristics configured such that one or more non-coated electrode tabs are provided for a plurality of stacked electrodes having the same polarity in order to prevent poor welding of a plurality of electrode tabs and/or electrode leads and to prevent the electrode tabs from being cut due to welding, and a secondary battery including the same.

It is a further object of the present invention to provide a secondary battery configured such that one or more non-coated electrode tabs are provided for a plurality of stacked electrodes having the same polarity at the time of ultrasonically welding electrode tabs and/or electrode leads, thereby achieving uniform welding strength distribution of a welded portion.

Technical Solution

In accordance with an aspect of the present invention, the above and other objects can be accomplished by the provision of a secondary battery electrode including one or more non-coated electrode tabs provided for a plurality of stacked electrodes having the same polarity.

The one or more overlapping non-coated electrode tabs may be coupled to an electrode lead in the state of being spaced apart from each other by a predetermined distance.

The one or more non-coated electrode tabs may be coupled to the electrode lead without exceeding the width of the electrode lead.

The thickness ($T_t$) of the non-coated electrode tabs provided for the stacked electrodes having the same polarity may be reduced in inverse proportion to the divided number of the overlapping non-coated electrode tabs.

The one or more overlapping non-coated electrode tabs may be arranged so as to alternately overlap each other.

The lower end of the electrode lead that is welded to the non-coated electrode tabs may be punched by the predetermined distance.

The punched length of the lower end may extend to an insulating tape region.

The non-coated electrode tabs provided for the stacked electrodes having the same polarity may be welded using a sonotrode horn, the sonotrode horn including a vibration-applying plate and a horn pattern region having at least one protrusion-type unit pitch pattern disposed on the vibration-applying plate, wherein the side surface of the protrusion-type unit pitch pattern disposed at the outer edge of the horn pattern region may be rounded as the divided number of the non-coated electrode tabs is increased, and welding may be performed in this state.

The non-coated electrode tabs provided for the stacked electrodes having the same polarity may be welded using a sonotrode horn, the sonotrode horn including a vibration-applying plate and a horn pattern region having at least one protrusion-type unit pitch pattern disposed on the vibration-applying plate, wherein the tip sharpness of the protrusion-type unit pitch pattern disposed at the outer edge of the horn pattern region may be reduced as the divided number of the non-coated electrode tabs is increased, and welding may be performed in this state.

In the case in which the protrusion-type unit pitch pattern comes into contact with the non-coated electrode tabs and/or the electrode lead for welding, the inscribed radius ($r_h$) of the protrusion-type unit pitch pattern that is formed together with the non-coated electrode tabs and/or the electrode lead may be increased as the divided number of the non-coated electrode tabs is increased.

The protrusion-type unit pitch pattern may be a hemispherical protruding pattern having a curvature formed at the side wall surface thereof.

In accordance with another aspect of the present invention, there is provided a secondary battery including the secondary battery electrode, wherein the secondary battery is a jelly-roll type battery or a stacked type battery.

In accordance with a further aspect of the present invention, there is provided a device including a secondary battery including the secondary battery electrode.

The device may be selected from the group consisting of an electric device, an electric vehicle, a hybrid electric vehicle, and a power storage apparatus.

BRIEF DESCRIPTION OF DRAWINGS

FIG. 1 is a view showing welded portions of electrode tabs and electrode leads of a conventional pouch-shaped secondary battery.

FIG. 2 is a conceptual view showing welding between electrode tabs and an electrode lead of a conventional pouch-shaped secondary battery.

FIG. 3 is a view showing a horn pattern region having a unit pitch pattern of a conventional pouch-shaped secondary battery.

FIG. 4 is a conceptual view showing welding between one or more overlapping non-coated electrode tabs and an electrode lead of a pouch-shaped secondary battery according to an embodiment of the present invention.

FIGS. 5a and 5b are conceptual views respectively showing a unidirectional pouch-shaped secondary battery according to an embodiment of the present invention before and after one or more overlapping non-coated electrode tabs are provided for electrodes having the same polarities.

FIGS. 6a and 6b are conceptual views respectively showing a bidirectional pouch-shaped secondary battery according to an embodiment of the present invention before and after one or more overlapping non-coated electrode tabs are provided for positive electrodes.

FIGS. 7a and 7b are conceptual views respectively showing a bidirectional pouch-shaped secondary battery according to an embodiment of the present invention before and after one or more overlapping non-coated electrode tabs are provided for negative electrodes.

FIG. 8 is a conceptual view showing the sectional shape of a unit pitch pattern at the time of welding electrode tabs of a pouch-shaped secondary battery.

FIG. 9 is a conceptual view showing the sectional shape of a unit pitch pattern at the time of welding one or more overlapping non-coated electrode tabs provided for electrodes of a pouch-shaped secondary battery according to an embodiment of the present invention.

FIGS. 10a, 10b, 10c, and 10d are conceptual views showing welding between one or more overlapping non-coated electrode tabs and an electrode lead of a pouch-shaped secondary battery according to an embodiment of the present invention.

FIG. 11 is a table showing the experimental results of welding defect rates and welding tensile strengths at the time of welding one or more overlapping non-coated electrode tabs and an electrode lead of a pouch-shaped secondary battery according to an embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is a view showing welded portions of electrode tabs and electrode leads of a conventional pouch-shaped secondary battery.

A pouch-shaped secondary battery according to the present invention, configured to have a structure in which leads 124, 125 are prevented from being cut using a thin plate, includes a plurality of pouch-shaped cell modules arranged so as to be stacked side by side, each of the pouch-shaped cell modules including a pair of pouch-shaped cells 100 stacked side by side, each of the pouch-shaped cells being configured such that an electrode assembly 120 is sealed by a pouch and such that positive electrode tabs and negative electrode tabs protrude out of the upper side of the pouch, and cell cases configured to be coupled to each other in order to receive the pouches of the pouch-shaped cells in a sealed state.

Each of the pouch-shaped cell modules is configured to have a structure in which the pouch surrounds the outer surface of the electrode assembly 120 of each of the pouch-shaped cells 100 such that the electrode assembly is sealed by the pouch. The positive electrode tabs 121 and the negative electrode tabs 122, which are formed so as to extend from one side of the electrode assembly 120, protrude out of the pouch. That is, each of the pouch-shaped cells is configured to have a structure in which the positive electrode tabs and the negative electrode tabs are formed so as to extend from one side of the electrode assembly and in which the pouch surrounds the electrode assembly, excluding the positive electrode tabs and the negative electrode tabs, so as to seal only the electrode assembly. Two pouch-shaped cells, each of which is formed as described above, are stacked side by side to make a pair. The cell cases, which are coupled to seal the pouches, are attached to the outer surfaces of the pouch-shaped cells.

That is, the portions of the pouch-shaped cells that are surrounded by the pouches, excluding the positive electrode tabs and the negative electrode tabs, are surrounded by the cell cases so as to be sealed by the cell cases. In this case, the cell cases may be configured so as not to tightly contact the pouches such that a predetermined space is provided in the cell cases.

Each of the pouch-shaped cell modules is configured to have a structure in which the positive electrode tabs and the negative electrode tabs protrude out of the cell cases in one direction and in which each of the electrode assemblies is sealed by a corresponding one of the pouches and is sealed again through the coupling of the cell cases to the outsides of the pouches, whereby each of the electrode assemblies is doubly sealed.

The electrode assembly of each of the pouch-shaped cells, which includes a positive electrode, a negative electrode, an electrolyte, and a separator for separating the positive electrode and the negative electrode from each other, is a member that is electrically charged and discharged. The positive electrode tabs and the negative electrode tabs are members that convey current generated when the electrode assembly is discharged or external current introduced into the electrode assembly when the electrode assembly is charged.

A plurality of pouch-shaped cell modules, each of which is configured as described above, is stacked side by side. The positive electrode tabs or the negative electrode tabs of one of the pouch-shaped cell modules, which protrude out of the cell cases, may be coupled to the positive electrode tabs of another of the pouch-shaped cell modules, and the negative electrode tabs of the one of the pouch-shaped cell modules may be coupled to the negative electrode tabs of yet another of the pouch-shaped cell modules. Consequently, the pouch-shaped cell modules may be connected to each other in series or in parallel.

Here, the positive electrode tabs and the negative electrode tabs may be coupled to each other using a connector or a connecting plate. Alternatively, the positive electrode tabs and the negative electrode tabs may be coupled to each other by laser welding or ultrasonic welding. The present invention is proposed in order to prevent a welded portion of positive electrode tabs and a positive electrode lead and a welded portion of negative electrode tabs and a negative electrode lead from being cut.

FIG. 2 is a conceptual view showing welding between electrode tabs and an electrode lead of a conventional pouch-shaped secondary battery.

As shown in FIG. 2, an ultrasonic welding machine 200 is provided in order to weld a plurality of electrode tabs and an electrode lead of an electrode assembly. The ultrasonic welding machine mainly includes a horn 220, an anvil 230, and an ultrasonic actuator 210 connected to the horn to vibrate the horn.

The electrode tabs include a plurality of positive electrode tabs 121 extending from a plurality of positive electrode plates constituting the electrode assembly 120 and a plurality of negative electrode tabs 122 extending from a plurality of negative electrode plates constituting the electrode assembly. The horn 220 is electrically connected to the ultrasonic actuator 210 so as to convey vibrations generated by the ultrasonic actuator to the anvil 230.

The anvil 230 is disposed adjacent to the horn 220 to support objects to be welded (a plurality of positive electrode tabs and a positive electrode lead or a plurality of negative electrode tabs and a negative electrode lead) such that the objects can be welded.

A sonotrode horn according to the present invention is a horn 220 supported by an anvil 230 in order to apply ultrasonic vibration to objects to be welded, and is characterized in that the sonotrode horn includes a vibration-applying plate 221 and a horn pattern region having at least one protrusion-type unit pitch pattern 222 disposed on the vibration-applying plate, wherein the side surface of the unit pitch pattern, disposed at the outer edge of the horn pattern region so as to be exposed outwards, is rounded.

In the present invention, a surface region having a protruding pattern of the sonotrode horn for vibration application is defined and described as a 'horn pattern region.'

FIG. 3 is a plan view showing the structure of a horn pattern region according to the present invention.

The horn pattern region is configured to have a structure in which a plurality of unit pitch patterns 222 is disposed. Each of the unit pitch patterns basically has a protruding pattern shape. In addition, the horn pattern region may include unit pitch patterns disposed at positions that are adjacent to the outer region and unit pitch patterns disposed at positions that are not adjacent to the outer region.

In the present invention, the edge of each of the unit pitch patterns is very sharp. For this reason, when a lead and tabs of a secondary battery are coupled to each other by ultrasonic welding, cracks are formed in objects to be welded due to the sharp edge of each of the unit pitch patterns. In order to solve this problem, the edge of each of the unit pitch patterns is rounded. Here, the term 'rounding' is a concept including all methods of shaping the edge of each of the unit pitch patterns so as to have a predetermined curvature.

FIG. 4 is a conceptual view showing welding between one or more overlapping non-coated electrode tabs and an electrode lead of a pouch-shaped secondary battery according to an embodiment of the present invention.

In the present invention, when positive electrodes or negative electrodes are stacked, the region of non-coated electrode tabs for the electrodes is divided into two parts such that one or more non-coated electrode tabs are sequentially stacked for the electrodes having the same polarities. Consequently, the number of non-coated electrode tabs to be welded between the electrodes is reduced by ½, whereby electrode welding efficiency is greatly improved. The present invention provides the shape of an electrode having improved welding efficiency and a new multi-electrode tab-terminal that remedies defects related to the electrode.

One or more non-coated electrode tabs may be provided for a plurality of stacked electrodes having the same polarity. The one or more overlapping non-coated electrode tabs may be coupled to an electrode lead in the state of being spaced apart from each other by a predetermined distance.

The non-coated electrode tabs may be formed at unidirectional electrode tabs, in which a positive (+) electrode and a negative (−) electrode are formed at the electrode assembly in the same direction. Alternatively, the non-coated electrode tabs may be formed at bidirectional electrode tabs, in which a positive (+) electrode and a negative (−) electrode are formed at the electrode assembly in opposite directions. Consequently, it is obvious that the electrode lead, to which the non-coated electrode tabs formed as described above are coupled, is limited thereto. That is, even in the case in which a plurality of non-coated electrode tabs is provided for electrodes having the same polarity, the non-coated electrode tabs are coupled to a single electrode lead provided for the electrodes having the same polarity. In addition, it is obvious that the distance between the non-coated electrode tabs is within the width of the single electrode lead provided for the electrodes having the same polarity, to which the coated electrode tabs are welded.

The electrode tabs may be formed at the stacked type battery in all four directions.

The number of non-coated electrode tabs is not limited to ½. It is obvious that division in the number of overlapping non-coated electrode tabs provided for the electrodes having the same polarity may be changed, as long as desired output and capacity of the battery are achieved.

Referring to FIG. 4, which shows an embodiment of the present invention, the thickness $T_t$ of the non-coated electrode tabs that are provided to achieve the same output and capacity of the battery may be reduced to ½ of the thickness of the welded electrode tabs shown in FIG. 2 by alternately stacking the non-coated electrode tabs. Consequently, it is possible to reduce damage to the non-coated electrode tabs at the time of welding.

In the case of a conventional stacked or folded type battery cell, the number of positive electrodes is 29, and the number of negative electrodes is 28. That is, the number of stacked electrodes is large, whereby the electrode tabs may be damaged or cut at the time of welding the electrode tabs.

In particular, as shown in FIG. 2, the tip of the horn may be deeply inserted into the upper electrode tabs, which are ultrasonically welded, whereby the upper electrode tabs may be severely damaged. In the case in which the upper electrode tabs are damaged, as described above, the upper electrode tabs may be separated from the electrode lead.

Even the lower electrode tabs may be insufficiently welded due to an increase in the thickness of the electrode tabs.

In addition, even when busbars are welded to the electrode lead in a battery pack manufacturing process, high-energy welding is required for a thick portion to be welded. At this time, the upper electrode tabs and the lower electrode tabs that are insufficiently welded may be further separated from the electrode lead due to damage thereto due to welding in the battery cell.

In the secondary battery, the unidirectional electrode terminals are formed by forming the positive and negative electrode tabs at the electrode assembly in the same direction and connecting the electrode tabs to electrode leads. The lifespan of a unidirectional cell is reduced due to the generation of heat from the electrode leads and nonuniformity of use of an active material in the cell at the time of charging and discharging the cell.

The bidirectional electrode terminals are formed by forming the positive and negative electrode tabs at opposite sides of the electrode assembly and connecting the electrode tabs to electrode leads. In the case in which a battery pack is manufactured using a bidirectional cell, a larger space is occupied than in the case of a unidirectional cell, whereby the energy density thereof may be reduced.

In the case of a battery cell having electrode leads formed in the same direction, the lifespan of the battery cell is reduced due to the generation of heat from the electrode leads and nonuniformity of use of an active material in the battery cell at the time of charging and discharging the battery cell. In the case of a battery cell having electrode leads formed in opposite directions, a larger space is occupied at the time of packing than in the case of the unidirectional cell, whereby the energy density thereof may be reduced.

FIGS. 5a and 5b are conceptual views respectively showing a unidirectional pouch-shaped secondary battery according to an embodiment of the present invention before and after one or more overlapping non-coated electrode tabs are provided for electrodes having the same polarities.

FIGS. 6a and 6b are conceptual views respectively showing a bidirectional pouch-shaped secondary battery according to an embodiment of the present invention before and after one or more overlapping non-coated electrode tabs are provided for positive electrodes.

As can be seen from FIGS. 5a, 5b, 6a, and 6b, the area of the non-coated electrode tabs provided for the electrodes is divided into two parts while the area of the non-coated electrode tabs provided for the electrodes remains within the width Tw of the corresponding electrode tabs of conventional electrodes.

As shown in FIGS. 5b and 6b, the non-coated electrode tabs are provided for electrodes having the same polarities include first negative electrode tabs 122 and second negative electrode tabs 128 and first positive electrode tabs 121 and second positive electrode tabs 127, unlike the case of the conventional electrode tabs, in which only first negative electrode tabs and first positive electrode tabs are provided.

The two electrodes are sequentially stacked such that the number of electrode tabs to be welded and the thickness of the welded layer are reduced by ½, whereby it is possible to improve welding efficiency and welding yield.

FIGS. 7a and 7b are conceptual views respectively showing a bidirectional pouch-shaped secondary battery according to an embodiment of the present invention before and after one or more overlapping non-coated electrode tabs are provided for negative electrodes. Although separators are disposed between the respective electrodes to isolate positive electrodes from the negative electrodes, the separators are omitted for easy comprehension of a conceptual view showing that the non-coated electrode tabs provided for negative electrodes are alternately stacked. In addition, it is obvious that the size of the positive electrodes is smaller than that of the negative electrodes and that the size of the separators, which are disposed respectively between the positive electrodes and the negative electrodes, is larger than that of the negative electrodes in order to prevent a direct short circuit between the positive electrodes and the negative electrodes in the structure in which the electrodes are stacked. In the case in which the electrodes are disposed upon practical application thereof, therefore, it is necessary to consider the welding characteristics of the non-coated electrode tabs, which are alternately stacked, in connection with the formation of left and right steps thereof. In order to weld the non-coated electrode tabs, therefore, the shape of the negative electrodes may be changed, as shown in FIGS. 10a, 10b, 10c, and 10d, in order to more flexibly implement the steps and to improve welding yield. In another method, a step design may be applied to the horn and the anvil of the ultrasonic welding machine in consideration of the left and right steps of the non-coated electrode tabs, and the left and right electrode tabs may be welded simultaneously or individually, whereby it is possible to improve welding yield.

FIG. 8 is a conceptual view showing the sectional shape of a unit pitch pattern at the time of welding electrode tabs of a pouch-shaped secondary battery.

FIG. 9 is a conceptual view showing the sectional shape of a unit pitch pattern at the time of welding one or more overlapping non-coated electrode tabs provided for electrodes of a pouch-shaped secondary battery according to an embodiment of the present invention.

In the case in which new negative electrodes are stacked, the non-coated electrode tabs may be spaced apart from each other by a predetermined distance in consideration of the position of the non-coated electrode tabs in order to prevent an increase in the thickness of the negative electrodes due to overlapping of the non-coated electrode tabs. In this case, electrodes having the same polarities are stacked, whereby it is possible to prevent the occurrence of a short circuit due to contact between the electrode tabs.

In addition, the tip sharpness of the unit pitch pattern is controlled by reducing the number of non-coated electrode tabs to be welded, whereby it is possible to use less extreme welding conditions.

A sonotrode horn for welding non-coated electrode tabs provided for a plurality of electrodes having the same polarity includes a vibration-applying plate and a horn pattern region having at least one protrusion-type unit pitch pattern disposed on the vibration-applying plate 221, wherein the side surface of the protrusion-type unit pitch pattern disposed at the outer edge of the horn pattern region is rounded as the divided number of the non-coated electrode tabs is increased, and welding is performed in this state.

A sonotrode horn for welding non-coated electrode tabs provided for a plurality of electrodes having the same polarity includes a vibration-applying plate 221 and a horn pattern region having at least one protrusion-type unit pitch pattern 222 disposed on the vibration-applying plate, wherein the tip 223 sharpness of the protrusion-type unit pitch pattern disposed at the outer edge of the horn pattern region is reduced as the divided number of the non-coated electrode tabs is increased, and welding is performed in this state.

The shape of the tip portion of the horn shown in FIG. 3 means that a conventional diamond shape is changed into a diamond shape having a larger size as the divided number of the non-coated electrode tabs is increased, whereby tip sharpness is reduced.

In the case in which the protrusion-type unit pitch pattern comes into contact with the non-coated electrode tabs and/or the electrode leads for welding, the inscribed radius $r_h$ of the protrusion-type unit pitch pattern that is formed together with the non-coated electrode tabs and/or the electrode leads may be increased as the divided number of the non-coated electrode tabs is increased.

FIGS. 10*a*, 10*b*, 10*c*, and 10*d* are conceptual views showing welding between one or more overlapping non-coated electrode tabs 122, 128 and an electrode lead 125 of a pouch-shaped secondary battery according to an embodiment of the present invention.

The mechanical strength of a negative electrode is high, and therefore it is more difficult to weld the negative electrode, since an electrode lead is generally made of a nickel-based material. In this case, as shown in FIGS. 10*c* and 10*d*, each non-coated negative electrode tab 122, 128 is divided into two parts, and then the divided non-coated negative electrode tabs are alternately stacked in order to reduce the thickness of the electrode by ½. In the case in which a new type of negative electrode tab considering the step generated at this time is applied, flexibility is achieved, whereby welding defects may be greatly reduced.

It is easy to weld a positive electrode, and therefore the shape of the conventional positive electrode tab shown in FIG. 10*a* is applied without being changed, since an electrode lead is generally made of an aluminum-based material. Even in the case of the positive electrode, it is obvious that a new type of electrode is applicable, in the same manner as in the negative electrode.

EXAMPLE

In a new electrode proposed by the present invention, different electrode tabs are sequentially stacked, whereby a step is formed between electrodes in proportion to the thickness thereof. However, the thickness is several tens to several hundreds of pam, and the thickness of electrode tabs to be welded is reduced by ½. Consequently, major problems are not caused in a conventional welding process. Nevertheless, welding defects may occur due to such a step formed between electrodes in proportion to the thickness thereof.

In the present invention, the shape of a lower electrode lead of an electrode tab-terminal to be welded is newly designed, whereby flexibility for a step between electrodes to be welded is provided to a welded portion of the electrode lead, and the welding defect rate is further reduced.

FIG. 11 is a table showing the experimental results of welding defect rates and welding tensile strengths at the time of welding one or more overlapping non-coated electrode tabs and an electrode lead of a pouch-shaped secondary battery according to an embodiment of the present invention.

In Example 2 of FIG. 11, the lower end of a conventional electrode lead is punched so as to have a depth Ld1, as shown in FIG. 10(*c*), in order to compensate for a step between the non-coated electrode tabs at the welded portion thereof. In the case of an actual battery for vehicles, the thickness of the electrode lead is large. Even in the case in which the lower end of the electrode lead is punched, therefore, flexibility is low. In Example 3 of FIG. 11, the lower end of the electrode lead is punched so as to have a depth Ld2, as shown in FIG. 10(*d*), and the region to which a protective film, such as a polypropylene film, is applied is changed in order to further provide flexibility, thereby improving welding efficiency at the step.

As the punching depth La of the electrode lead is increased, flexibility is also increased. In this case, however, pouch sealing properties may be worsened. For this reason, it is necessary to punch the electrode lead so as to have an appropriate depth.

Those skilled in the art to which the present invention pertains will appreciate that various applications and modifications are possible based on the above description, without departing from the scope of the present invention.

100: Battery cell
110: Upper pouch
120: Electrode assembly
121: First positive electrode tabs
122: First negative electrode tabs
123: Protective film
124: Positive electrode lead
125: Negative electrode lead
126: Welded portion
127: Second positive electrode tabs
128: Second negative electrode tabs
129: Punched portion
130: Lower pouch
200: Ultrasonic welding machine
210: Ultrasonic actuator
220: Horn
221: Vibration-applying plate
222: Unit pitch pattern
223: Tip
230: Anvil

INDUSTRIAL APPLICABILITY

As is apparent from the above description, a secondary battery electrode configured such that one or more non-coated electrode tabs are provided for a plurality of stacked electrodes having the same polarity according to the present invention and a secondary battery including the same have the effect of preventing the electrode tabs from being cut at the time of welding the electrode tabs.

In addition, the present invention has the effect of being able to perform welding in a pressurized state, thereby making the welding time and amplitude consistent.

In addition, the present invention has the effect of punching the lower end of an electrode lead that is welded to non-coated electrode tabs provided for a plurality of stacked electrodes having the same polarity so as to correspond to the non-coated electrode tabs, thereby improving flexibility of a step formed in the secondary battery electrode.

In addition, non-coated electrode tabs are provided for a plurality of stacked electrodes having the same polarity, whereby the thickness of the non-coated electrode tabs is reduced. Consequently, the tip sharpness of a sonotrode horn is reduced, whereby it is possible to reduce a welding defect rate.

The invention claimed is:

1. A secondary battery electrode assembly, comprising:
 a plurality of negative electrodes alternatingly interleaved with a plurality of positive electrodes in a vertical stack, with respective separators disposed between adjacent ones of the electrodes;
 a plurality of non-coated electrode tabs, each of the plurality of non-coated electrode tabs extending from a respective one of the electrodes having a first same polarity that is either negative or positive, the plurality of non-coated electrode tabs being arranged in first and second spaced-apart vertical stacks so that the tabs in the first vertical stack overlap each other and the tabs in the second vertical stack overlap each other, such that the electrode tabs in the first vertical stack extend from a first odd-numbered half of the electrodes having the first same polarity, and the electrode tabs in the second vertical stack extend from a second even-numbered half of the electrodes having the first same polarity; and an electrode lead having a flat planar shape defining a major surface parallel to respective planes in which the negative electrodes and positive electrodes extend, the electrode tabs in the first vertical stack being coupled to the electrode lead at a first location, the electrode tabs in the second vertical stack being coupled to the electrode lead at a second location, the tabs in the first vertical stack being spaced apart from the tabs in the second vertical stack by a predetermined distance, the predetermined distance being equal to or greater than a width of the tabs in the first vertical stack and a width of the tabs in the second vertical stack, wherein a lower end of the electrode lead that is welded to the electrode tabs is shaped so that the first and second locations are at first and second portions of the lower end of the electrode lead that are separated from one another by the predetermined distance, wherein a length of each of the first and second portions of the lower end of the electrode lead extends from a lower edge of the electrode lead to an intermediate portion of the electrode lead that is spaced apart from the lower edge and spaced apart from a central region of the electrode lead that is configured to be affixed to a sealing part of a pouch-shaped battery case by an insulating tape, and wherein a width of each of the first and second portions of the lower end of the electrode lead is greater than or equal to the width of the tabs in the first vertical stack and the width of the tabs in the second vertical stack.

2. The secondary battery electrode assembly according to claim 1, wherein the predetermined distance is less than or equal to a width of the electrode lead.

3. The secondary battery electrode assembly according to claim 1, wherein a first total thickness of the electrode tabs in the first vertical stack and a second total thickness of the electrode tabs in the second vertical stack are each equal to half of a third total thickness of all of the electrode tabs having the first same polarity.

4. A secondary battery comprising the secondary battery electrode assembly according to claim 1, wherein the secondary battery is a jelly-roll type battery or a stacked type battery.

5. A device comprising a secondary battery comprising the secondary battery electrode assembly according to claim 1.

6. The device according to claim 5, wherein the device is selected from a group consisting of: an electric device, an electric vehicle, a hybrid electric vehicle, and a power storage apparatus.

* * * * *